(12) United States Patent
Maurer et al.

(10) Patent No.: US 10,378,767 B2
(45) Date of Patent: Aug. 13, 2019

(54) TURBULATOR STRUCTURE ON COMBUSTOR LINER

(71) Applicant: ANSALDO ENERGIA SWITZERLAND AG, Baden (CH)

(72) Inventors: Michael Thomas Maurer, Bad Säckingen (DE); Jeffrey De Jonge, Baden (CH); Karolina Krystyna Sobol, Küsnacht (CH)

(73) Assignee: ANSALDO ENERGIA SWITZERLAND AG, Baden (CH)

( * ) Notice: Subject to any disclaimer, the term of this patent is extended or adjusted under 35 U.S.C. 154(b) by 694 days.

(21) Appl. No.: 14/993,683

(22) Filed: Jan. 12, 2016

(65) Prior Publication Data

US 2016/0209034 A1 Jul. 21, 2016

(30) Foreign Application Priority Data

Jan. 15, 2015 (EP) ..................................... 15151204

(51) Int. Cl.
*F23R 3/00* (2006.01)
*F01D 25/12* (2006.01)
(Continued)

(52) U.S. Cl.
CPC ............ *F23R 3/002* (2013.01); *B23K 1/0004* (2013.01); *B23K 11/115* (2013.01); *F01D 25/12* (2013.01);
(Continued)

(58) Field of Classification Search
CPC .. F23R 3/002; F23R 3/005; F02C 7/16; F01D 25/12; F05D 2240/35; F05D 2220/32;
(Continued)

(56) References Cited

U.S. PATENT DOCUMENTS 3,084,770 A * 4/1963 Wirsing, Jr. ............ E04C 2/365
156/197
3,610,876 A * 10/1971 Bhat .................... B23K 33/004
219/137 R
(Continued)

FOREIGN PATENT DOCUMENTS

AU 2003301451 A1 5/2004
CN 101981381 A 2/2011
(Continued)

OTHER PUBLICATIONS

European Search Report dated Jun. 30, 2015.
(Continued)

*Primary Examiner* — Todd E Manahan
*Assistant Examiner* — Eric W Linderman
(74) *Attorney, Agent, or Firm* — Buchanan Ingersoll & Rooney, PC

(57) ABSTRACT

A method of manufacturing a hot gas wall for a gas turbine is described. The method is carried out on a hot gas wall having a wall part with a front side and a back side, the wall part being for exposure to a hot fluid on the front side, and the hot gas wall also having a turbulator structure. In an exemplary embodiment, a turbulator structure is attached to the wall by placing a braze foil on the back side of the wall part, placing a turbulator structure on the braze foil, and brazing to attach the turbulator structure to the wall part. In another embodiment, the turbulator structure is attached by passing a current through the turbulator structure part and the wall part to resistance weld the turbulator structure part to the wall part.

7 Claims, 8 Drawing Sheets

(51) Int. Cl.
*B23K 1/00* (2006.01)
*B23K 11/11* (2006.01)
*F02C 7/16* (2006.01)

(52) U.S. Cl.
CPC ............... *F02C 7/16* (2013.01); *F23R 3/005* (2013.01); *F05D 2220/32* (2013.01); *F05D 2230/237* (2013.01); *F05D 2230/238* (2013.01); *F05D 2240/35* (2013.01); *F05D 2250/183* (2013.01); *F05D 2250/283* (2013.01); *F05D 2260/20* (2013.01); *F05D 2260/201* (2013.01); *F05D 2260/2212* (2013.01); *F05D 2260/22141* (2013.01); *F23R 2900/00017* (2013.01); *F23R 2900/00018* (2013.01); *F23R 2900/03045* (2013.01)

(58) Field of Classification Search
CPC ......... F05D 2260/20; F05D 2260/2212; F05D 2260/2214; F05D 2260/22141; F05D 2250/00; F05D 2250/183; F05D 2250/283; B23K 11/115; B23K 11/002; B23K 11/0033; B23K 11/004
See application file for complete search history.

(56) References Cited

U.S. PATENT DOCUMENTS

| | | | | |
|---|---|---|---|---|
| 3,734,234 | A * | 5/1973 | Wirt | E04B 1/86 181/286 |
| 4,048,463 | A * | 9/1977 | Bennett | B23K 11/115 219/118 |
| 4,384,020 | A * | 5/1983 | Beggs | B32B 3/12 428/138 |
| 4,642,993 | A | 2/1987 | Sweet | |
| 4,832,999 | A | 5/1989 | Sweet | |
| 5,783,794 | A * | 7/1998 | Oikawa | B23K 11/115 219/118 |
| 6,485,025 | B1 * | 11/2002 | Hammersley | B23K 1/0014 277/414 |
| 8,220,273 | B2 | 7/2012 | Iwasaki | |
| 8,357,870 | B1 * | 1/2013 | Edwards, II | B23K 11/251 219/78.01 |
| 8,959,886 | B2 * | 2/2015 | Lee | F23R 3/005 60/39.37 |
| 9,273,562 | B2 | 3/2016 | Bruck | |
| 2002/0015641 | A1 * | 2/2002 | Beeck | F01D 11/127 415/173.1 |
| 2006/0042255 | A1 * | 3/2006 | Bunker | F01D 25/12 60/752 |
| 2010/0083663 | A1 * | 4/2010 | Fernandes | F23R 3/286 60/748 |
| 2011/0016869 | A1 * | 1/2011 | Iwasaki | F23R 3/002 60/752 |
| 2011/0062220 | A1 * | 3/2011 | Feng | B23K 35/3033 228/119 |
| 2012/0060504 | A1 * | 3/2012 | Dugar | F23R 3/002 60/772 |
| 2012/0159954 | A1 * | 6/2012 | Ito | F01D 9/023 60/752 |
| 2012/0247120 | A1 | 10/2012 | Dugar et al. | |
| 2012/0272654 | A1 * | 11/2012 | Kaleeswaran | F23R 3/002 60/772 |
| 2013/0115480 | A1 | 5/2013 | Bruck | |
| 2013/0180252 | A1 * | 7/2013 | Chen | F23R 3/002 60/754 |
| 2013/0180689 | A1 * | 7/2013 | Boning | B23P 15/26 165/109.1 |
| 2014/0090385 | A1 | 4/2014 | Kodukulla et al. | |
| 2015/0016947 | A1 * | 1/2015 | Kwon | F01D 5/186 415/1 |
| 2016/0104902 | A1 * | 4/2016 | Okabe | B23K 11/004 219/91.2 |
| 2017/0326677 | A1 * | 11/2017 | Azeddine | B23K 11/002 |
| 2018/0009057 | A1 * | 1/2018 | Chergui | B23K 11/002 |

FOREIGN PATENT DOCUMENTS

| | | |
|---|---|---|
| CN | 103216848 A | 7/2013 |
| CN | 103917325 A | 7/2014 |
| EP | 0 202 050 A1 | 11/1986 |
| EP | 0 314 261 A1 | 5/1989 |
| EP | 2 267 369 A1 | 12/2010 |
| EP | 2 713 106 A1 | 4/2014 |
| WO | WO 2004/035992 A1 | 4/2004 |

OTHER PUBLICATIONS

Office Action (First Office Action) dated Feb. 22, 2019, by the Chinese Patent Office in corresponding Chinese Patent Application No. 201610027370.3, and an English Translation of the Office Action. (31 pages).

* cited by examiner

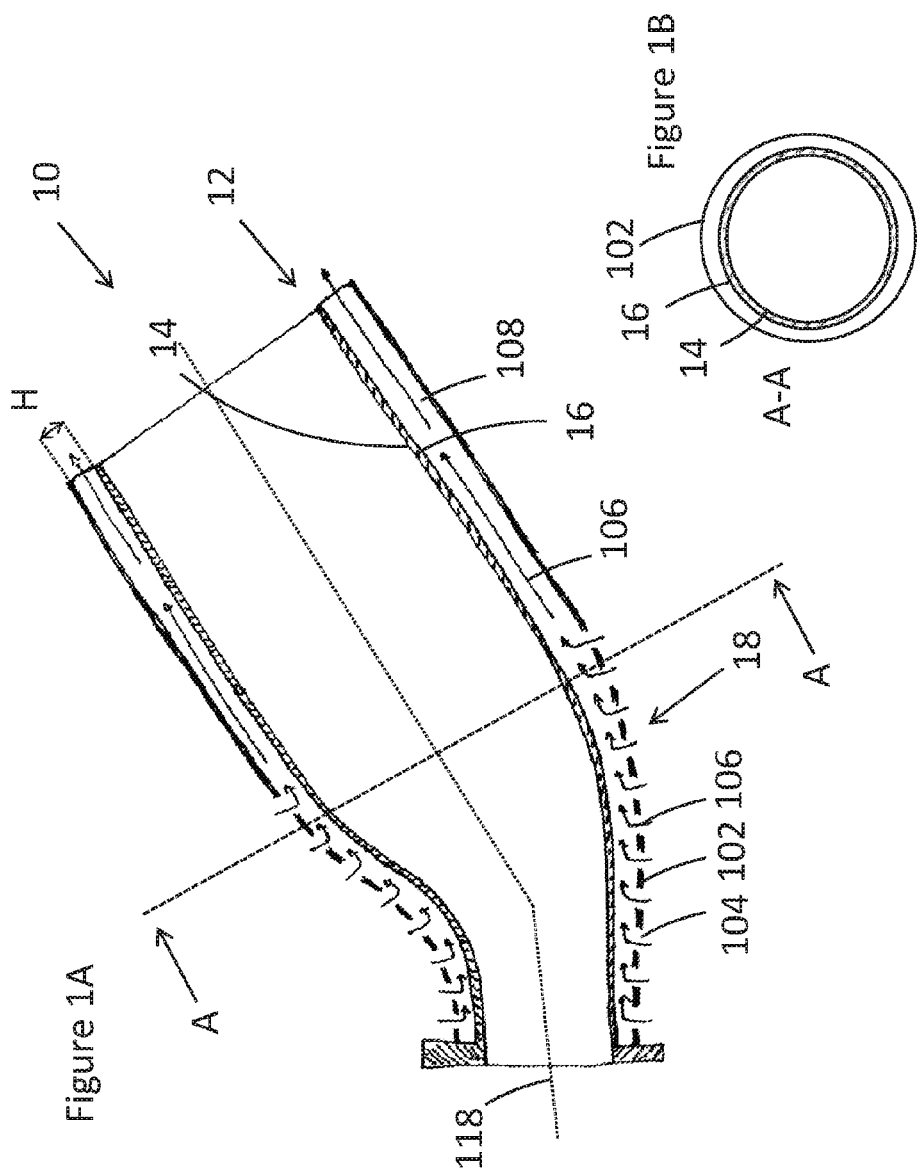

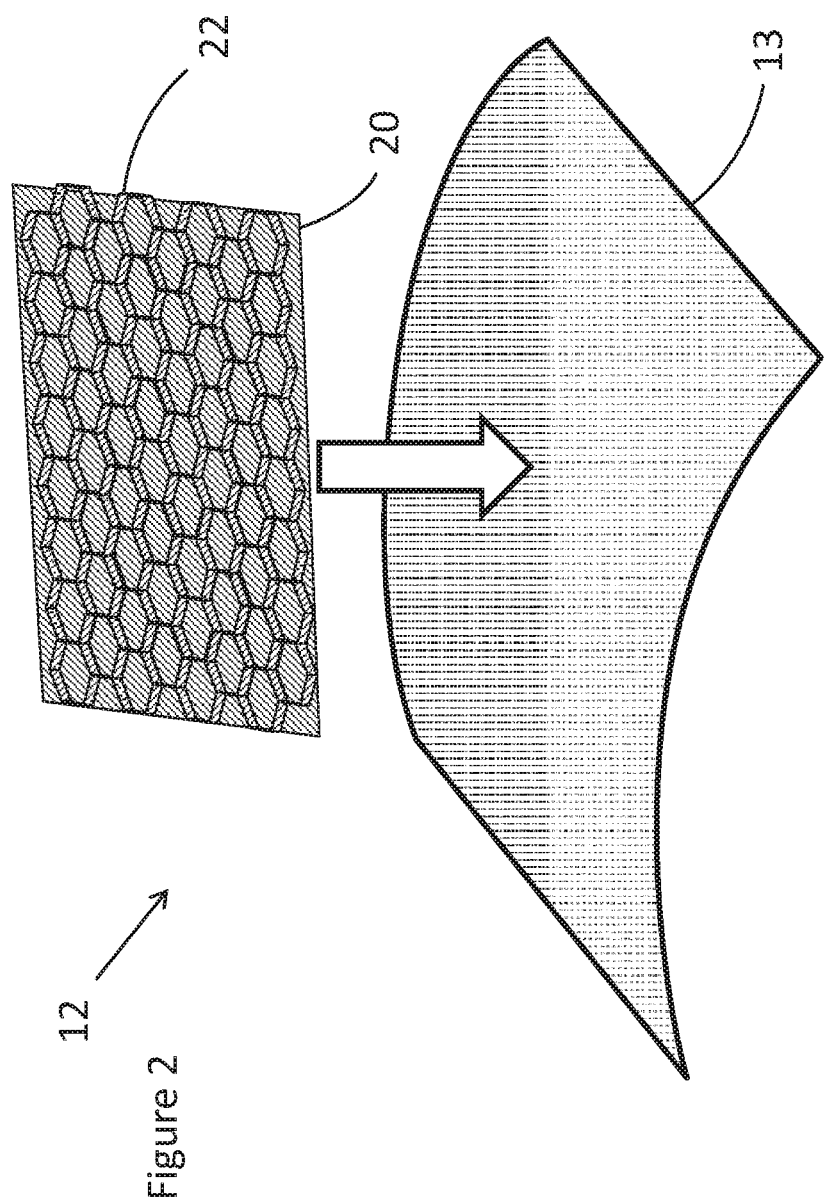

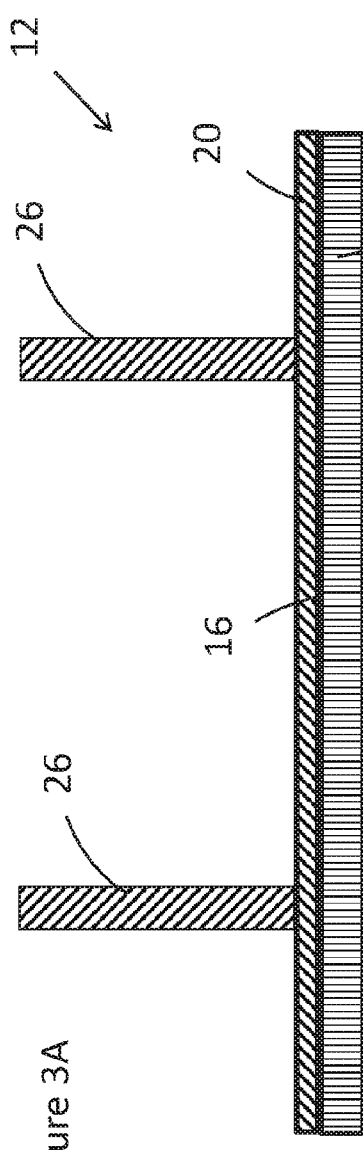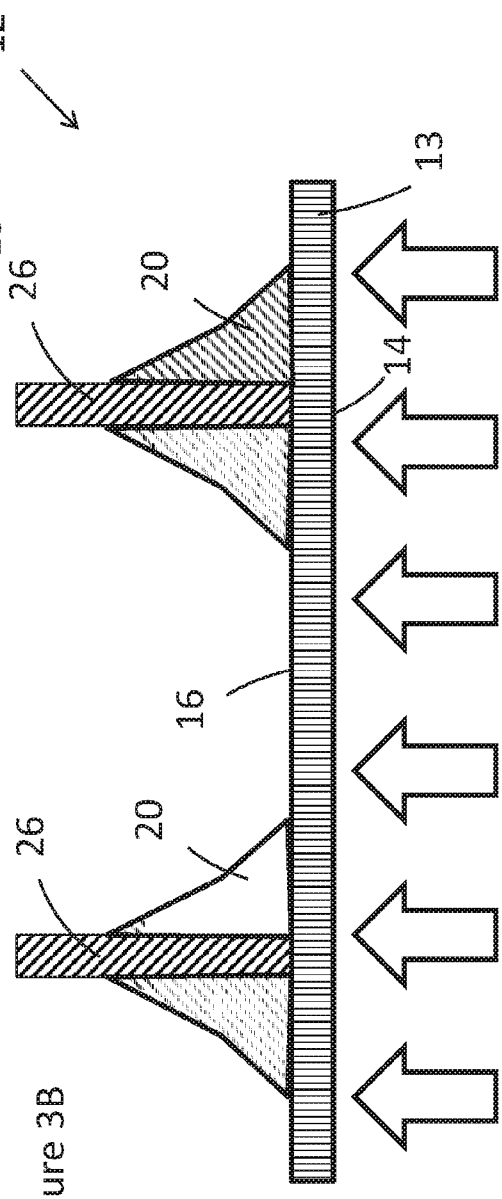

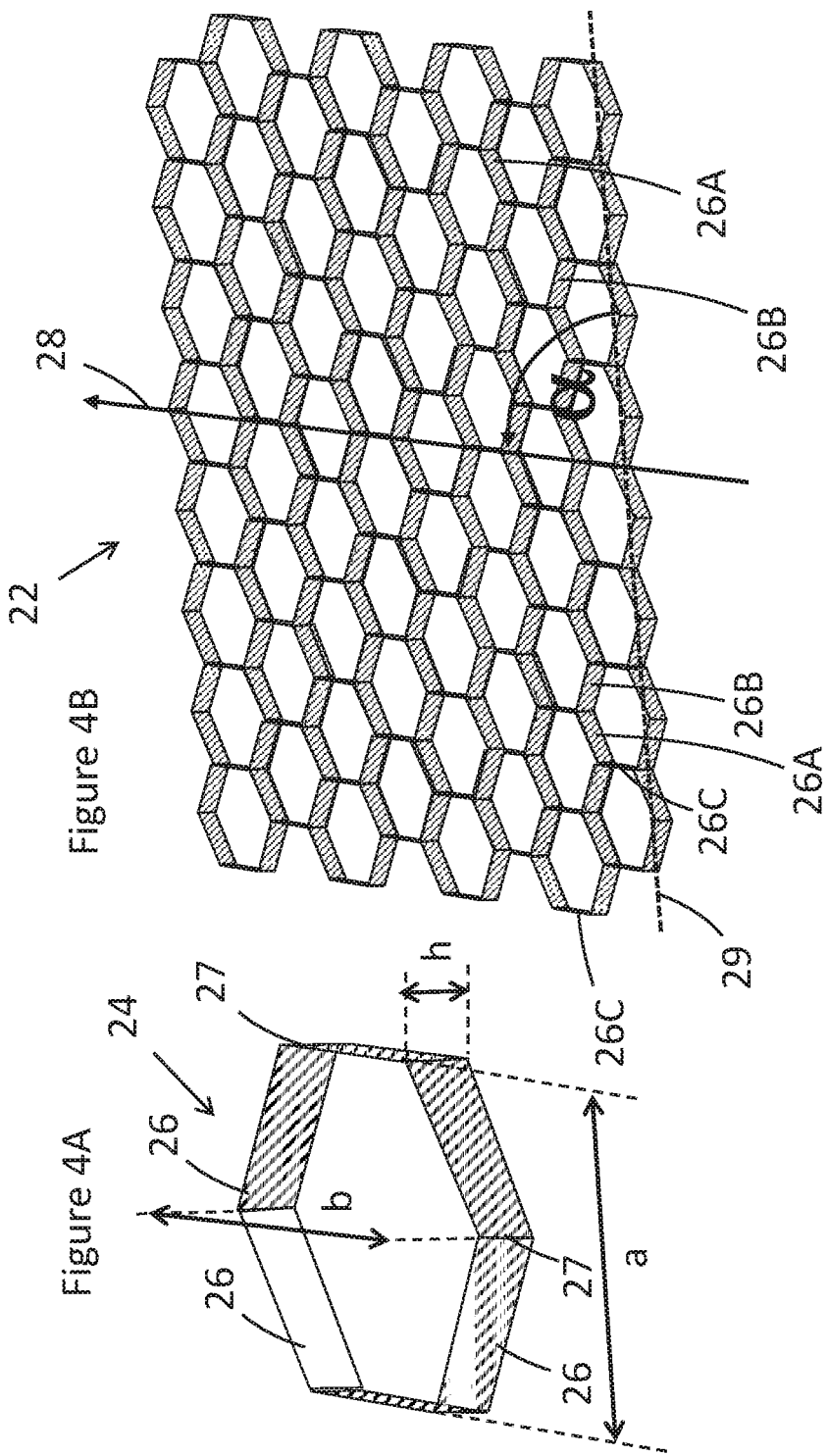

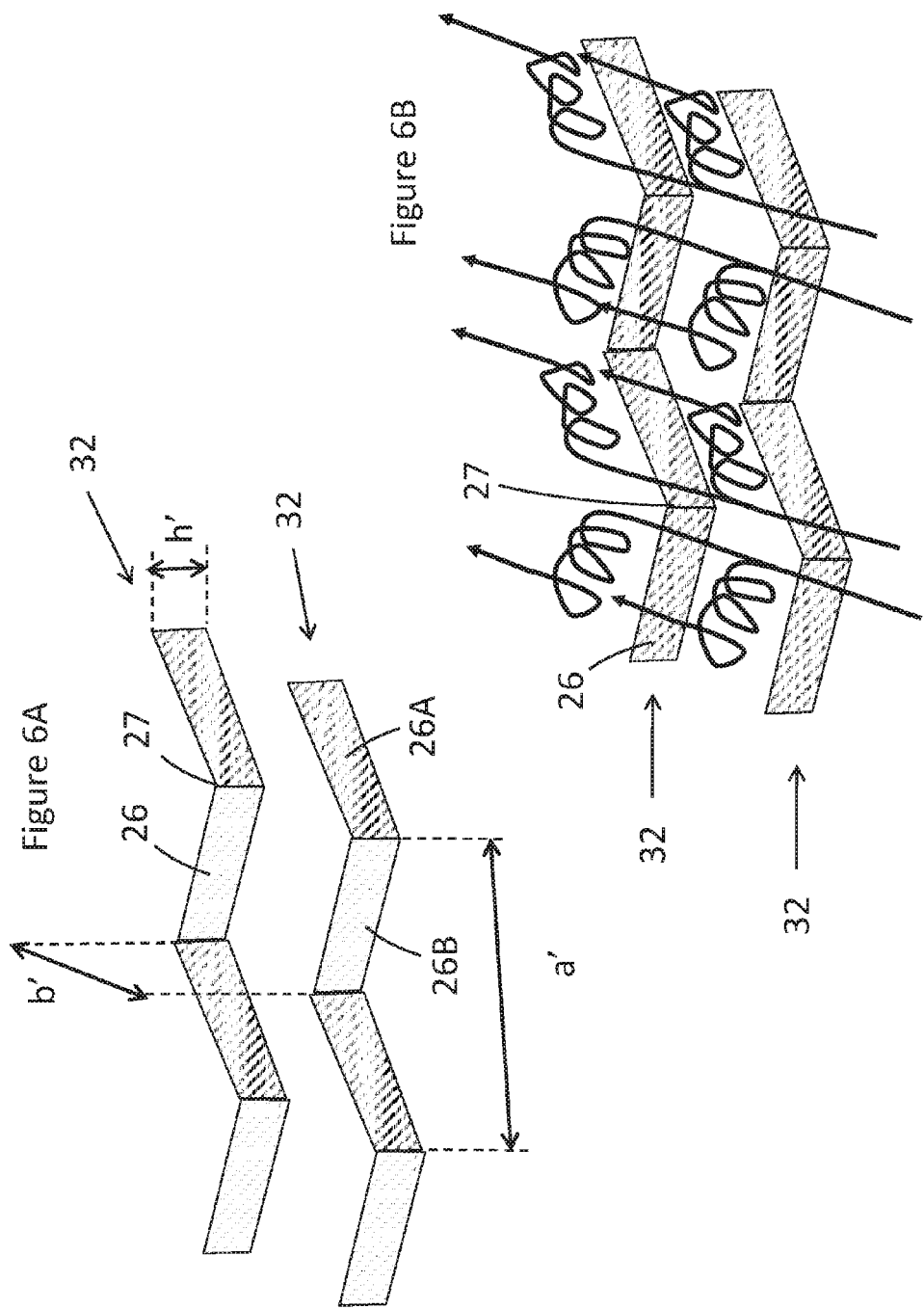

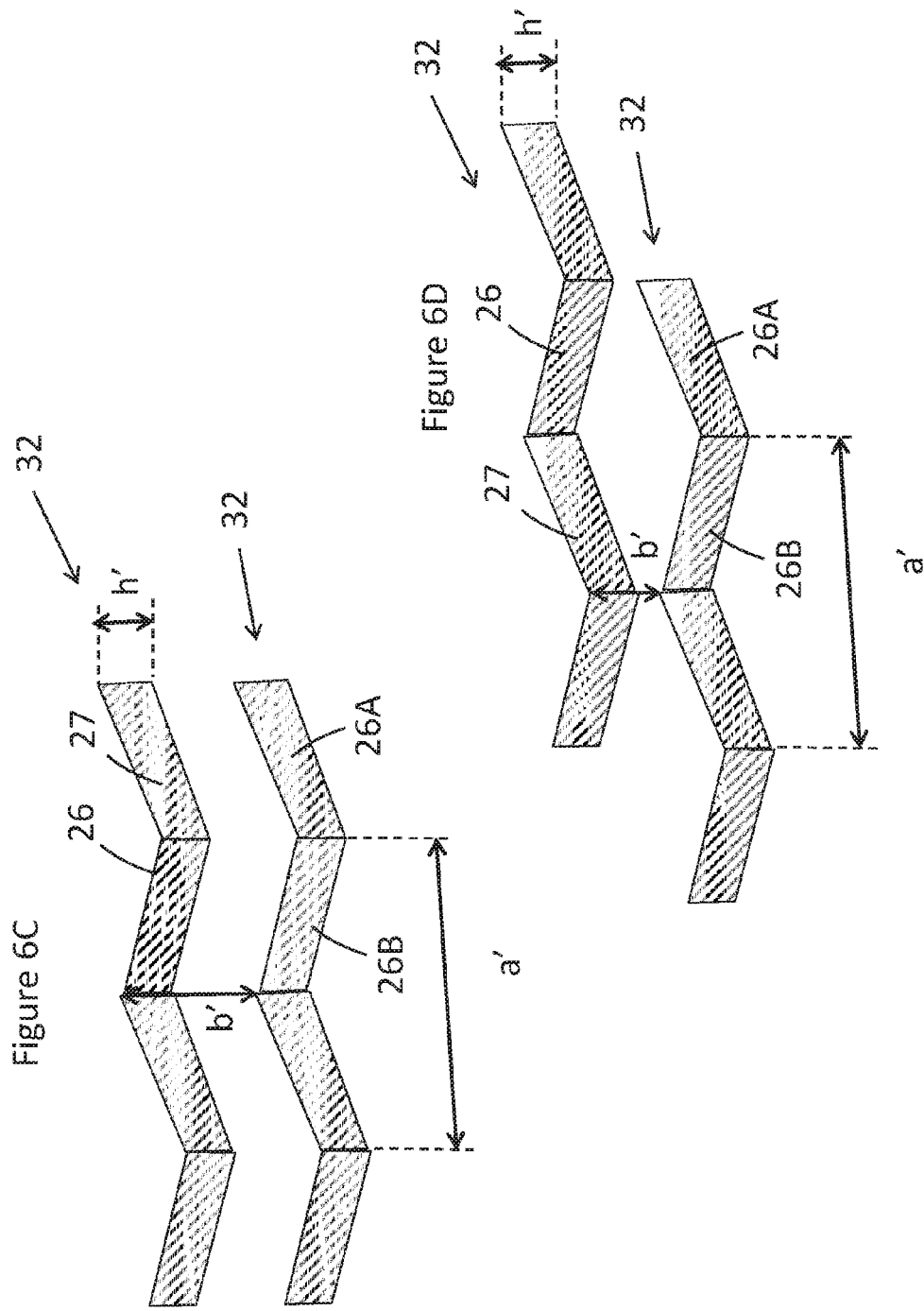

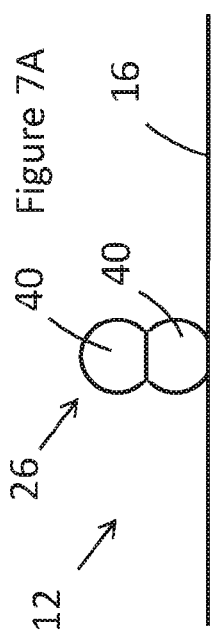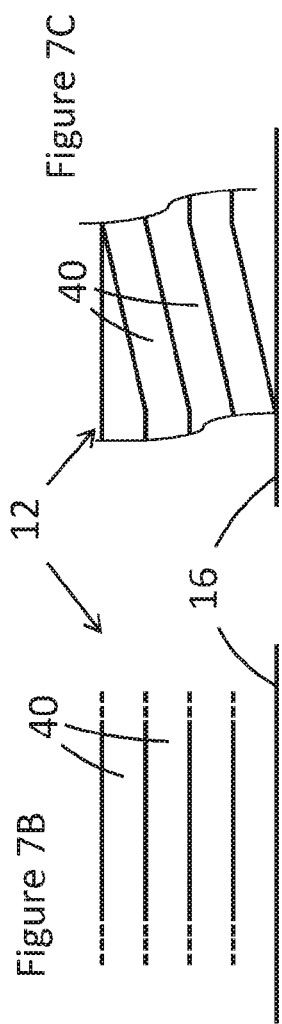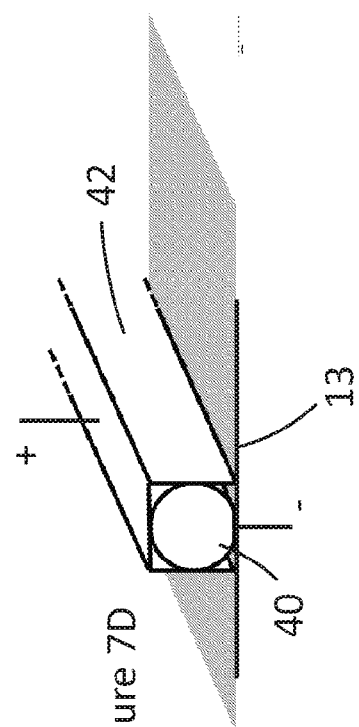

TURBULATOR STRUCTURE ON COMBUSTOR LINER

TECHNICAL FIELD

This invention relates to methods and apparatus for cooling a hot gas wall, and particularly to methods and apparatus for attaching turbulator structures to the back side of a wall part of a hot gas wall.

BACKGROUND OF THE INVENTION

Gas turbine combustors use sequential liner cooling to cool the back side of hot gas walls with impingement cooling or convective cooling. Cooling features such as turbulators may be provided on the back side of these hot gas walls, but these cooling features must be cast or milled out of a solid piece of metal. This is extremely time consuming, and makes providing turbulators on the back side of hot gas walls prohibitively expensive. It also limits the placement and shape of the turbulators, and existing solutions only provide straight cooling ribs on the cylindrical part of sequential liners.

SUMMARY OF THE INVENTION

According to a first aspect of the invention, there is provided a method of manufacturing a hot gas wall for a gas turbine, the hot gas wall having a wall part with a front side and a back side, the wall part being for exposure to a hot fluid on the front side, and the hot gas wall also comprising a turbulator structure, the method comprising the step of attaching a turbulator structure to the wall part by brazing or resistance welding.

With this method advanced turbulator structures can be added, even to highly 3D shapes (shapes which curve in all three dimensions) such as the transition region between a cylindrical part and a turbine interface. This improves convective cooling in flow channels compared to existing solutions. Improved cooling allows to reduction of cooling fluid consumption and/or improves the part cooling, both of which can lead to turbine efficiency improvements.

With this method, the turbulator structure can be added at an optimised cooling flow angle of attack, and it can be added locally, for example in hot spot regions. This also means that turbulator structures with different parameters (e.g. different honeycomb height) can be added in different regions, optimising cooling. In general, the method is more flexible than existing methods. Retrofitting of existing parts is also possible.

In an embodiment, the wall part comprises a curved section and the turbulator structure is attached to the curved section of the wall part. In an embodiment, the curved section is curved along a longitudinal direction denoted by a longitudinal axis and also curved in the plane perpendicular to the longitudinal axis.

In an embodiment, attaching a turbulator structure by brazing comprises the steps of placing a braze foil on the back side of the wall part, placing a turbulator structure on the braze foil, and brazing to attach the turbulator structure to the wall part. Use of a braze foil allows dissimilar materials to be attached to the back side of the wall part. The resulting part is also ductile, allowing part flexibility.

In an embodiment, attaching the turbulator structure by resistance welding comprises the steps of placing a turbulator structure part on the back side of the wall part, and passing a current through the turbulator structure part and the wall part to resistance weld the turbulator structure part to the wall part.

According to a second aspect of the invention, there is provided a method of cooling a hot gas wall for a gas turbine, the hot gas wall having a wall part with a front side and a back side, the wall part being for exposure to a hot fluid on the front side, and the hot gas wall comprising a turbulator structure attached to the back side of the wall part by a weld or by a braze alloy, comprising the step of directing a cooling fluid along the back side of the wall part.

According to a third aspect of the invention, there is provided a hot gas wall for a gas turbine, the hot gas wall having a wall part with a front side and a back side, the wall part being for exposure to a hot fluid on the front side, and the hot gas wall comprising a turbulator structure attached to the back side of the wall part by a weld or by a braze alloy.

In an embodiment, the wall part comprises a curved section and the turbulator structure is attached to the curved section of the wall part. In an embodiment, the curved section is curved along a longitudinal direction denoted by a longitudinal axis and also curved in the plane perpendicular to the longitudinal axis.

In an embodiment, the turbulator structure is arranged in a honeycomb or a chevron pattern. A chevron pattern or a honeycomb pattern can provide greater cooling fluid residence time and greater surface area, and therefore increased heat transfer, compared to other turbulator structures such as lines. These patterns can also result in an increased surface area from the ribs, also leading to increased heat transfer.

In an embodiment, the hot gas wall additionally comprises an impingement sheet arranged to direct a cooling fluid flow along the back side of the wall part. This can channel the cooling fluid along the back wall.

In an embodiment, the turbulator structure comprises a first set of ribs parallel to one another and a second set of ribs parallel to one another and not parallel to the first set of ribs, wherein the turbulator structure is orientated such that a cooling flow direction is parallel to the first set of ribs, or such that a cooling flow direction is at the same angle from the first set of ribs and the second set of ribs. These cooling flow directions can mean greater cooling fluid residence time.

According to a fourth aspect of the invention, there is provided a gas turbine or a gas turbine combustor comprising the hot gas wall described above.

According to a fifth aspect of the invention, there is provided hot gas wall resistance welding apparatus for manufacturing a hot gas wall for a gas turbine as described above, comprising a casing for surrounding a turbulator structure part, a first electrode attached to the casing, a second electrode for attaching to the front side of the hot gas wall, and a source of current attached to the first electrode and the second electrode for passing a current through the turbulator structure part and the wall part to resistance weld the turbulator structure part to the wall part. This allows for a cost effective and flexible method of providing a turbulator structure.

BRIEF DESCRIPTION OF THE DRAWINGS

An embodiment of the invention will now be described by way of example only and with reference to the accompanying drawings in which:

FIG. 1A shows a cross-section view of a gas turbine combustor in which the present invention could be implemented;

FIG. 1B shows a cross-section view along A-A of FIG. 1A;

FIG. 2 shows a perspective view of the parts of a hot gas wall during construction;

FIGS. 3A and 3B show a cross-section view of the parts of a hot gas wall during steps in manufacture;

FIG. 4A shows a perspective view of a hexagon of a turbulator structure;

FIG. 4B shows a perspective view of the turbulator structure;

FIGS. 6A and 6B show perspective views of an alternative turbulator structure:

FIGS. 6C and 6D show perspective views of alternatives to the rib layout of FIG. 6A;

FIG. 7A shows a cross-section view through a portion of a turbulator structure:

FIGS. 7B and 7C show cross-section views through a portion of the turbulator structure of FIG. 7A; and FIG. 7D shows a perspective view of apparatus being used to build up a turbulator structure.

Figure 5:
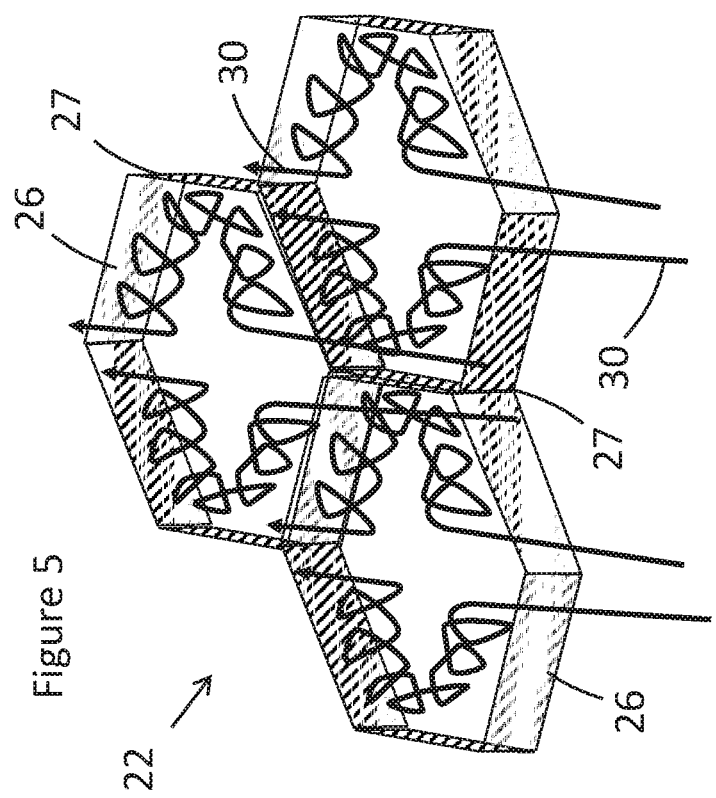
FIG. 5 shows a perspective view of flow patterns over a turbulator structure.

DETAILED DESCRIPTION OF THE
PREFERRED EMBODIMENTS

FIG. 1A shows a gas turbine combustor 10. A hot gas wall 12 has a wall part 13 comprising a front side 14 and a back side 16, along with a curved section 18. The front side 14 of the wall part is for exposure to a hot fluid. The other features of the hot gas wall 12 are not shown in this diagram.

The curved section 18 of the hot gas wall 12 is curved in two different directions; firstly, it is curved along the longitudinal direction denoted by longitudinal combustor axis 118, and secondly it is curved in the plane perpendicular to the longitudinal combustor axis as shown in FIG. 1B.

Some additional features of the gas turbine combustor are also shown, including impingement sheet 102 with cooling holes 104 and cooling fluid flow 106 (such as cooling air) along cooling channel 108.

FIG. 2 shows the components of the hot gas wall 12 of FIG. 1A. A braze foil 20 (brazing sheet, also known as braze tape, braze paste or braze alloy) is placed on top of the wall part 13 (liner wall), and a turbulator structure, in this case a honeycomb structure 22, is placed on top of the braze foil 20.

FIG. 3A shows a cross-section view through a turbulator structure such as honeycomb structure 22 (which is made up of ribs 26) after the separate components of the hot gas wall 12 have been placed together and prior to brazing the separate components (wall part 13, braze foil 20 and ribs 26) together. FIG. 3B then shows the structure after brazing; the braze foil 20 now attaches the honeycomb structure 22 (made of ribs 26) to the wall part 13. With an appropriate braze material and thickness, an optimal turbulator is formed by the brazing foil (sheet) after brazing; the braze foil is sucked up alongside the ribs by the capillary effect. An area of contact between the braze foil 20 and the back side 16 of the wall part allows more heat to be transferred, so a larger area of contact is generally preferred.

For brazing, the heat would typically be provided from the front side of the wall, as shown by the arrows in FIG. 3B.

FIG. 4A shows a perspective view of a single hexagon 24 of a honeycomb structure, which is built up of ribs 26. The height h is the distance from the proximal side of a rib (i.e. the side of the rib adjacent to the wall part) to the distal side of a rib (i.e. the side of the rib furthest from the wall part).

The width a is the width of a single hexagon from one rib to a rib on the opposite side of the hexagon. The width b (or depth) is the width of a single hexagon from the join 27 between two ribs and the opposite join between two ribs.

The ratio between the height h and the distance H (the distance between the back side 16 of the hot gas wall 12 and the impingement sheet 102, as shown in FIG. 1A) is between 0.01 and 0.3, more preferably between 0.015 and 0.15, and most preferably between 0.03 and 0.10. The ratio between the width a and the height h is preferably between 1 and 10, more preferably between 4 and 7 and most preferably 5. The ratio between the width b and the height h is preferably between 1 and 10, more preferably between 4 and 7 and most preferably 5.

A honeycomb structure offers an additional wall at a symmetry location, meaning that the turbulent flow is kept in the honeycomb (in between the ribs) for longer than in other turbulator arrangements. For example, when the additional wall is not present, such as in the case of a chevron rib configuration, turbulent flow structures are initiated at the backside of the rib (the backside when looking from the flow direction). These secondary flow structures travel along the rib until they meet a neighbouring flow structure of the same kind from an adjacent rib. The turbulent structures then leave the area in between the ribs. A honeycomb structure also offers a greater surface area, meaning that the total heat load extracted from the combustion chamber can be increased.

FIG. 4B shows a honeycomb structure as in FIG. 2, built up of the hexagons of FIG. 4A. In a method of cooling a hot gas wall as described above, a cooling flow (preferably a convective cooling flow) is directed along the back wall past a turbulator structure, and FIG. 4B indicates an example of this with the cooling flow direction 28 over the honeycomb structure. In this case, the cooling flow direction is parallel to one set of ribs within the honeycomb structure; when looking from a join 27 in a honeycomb structure, honeycomb structures have three sets of ribs, each one at a 120° angle from the other two. The ribs within each set are preferably parallel (along a longitudinal rib axis). To illustrate this, three sets of ribs 26A, 26B, 26C are marked in FIG. 4B. An alternative definition takes a straight line 29 across the honeycomb defined as a line following a zigzag of ribs (alternative left and right turns, for example a line of ribs 26A and 26B, or a line of ribs 26A and 26C) across the honeycomb structure (along a turbulator strip). Three sets of parallel lines of this type are possible, and the cooling flow direction 28 (cooling flow angle of attack) is set at right angles to one of these lines, i.e. α=90°, where a is the angle between the line following (parallel to) a zigzag of ribs and the cooling flow direction 28. This is also a flow direction parallel to the longitudinal rib axis of a set of ribs. Preferably, the flow direction is within ±20° of the longitudinal rib axis of a set of ribs, and most preferably the flow direction is parallel to the longitudinal direction of a set of ribs (i.e. α is preferably between 70° and 110°, and most preferably α=90°).

The reason for this preferred cooling flow direction is shown in FIG. 5, which shows three hexagons of a honeycomb structure such as that in FIGS. 2, 4A and 4B. Cooling flow lines 30 indicate a typical path for cooling fluid as it passes across the honeycomb structure. The structure induces a turbulent flow of cooling fluid past the back side 16, increasing the residence time of the cooling fluid proximate the back side, thereby allowing for an increase in heat transfer from the back wall to the cooling fluid, and therefore increasing cooling efficiency.

FIG. 6A shows an alternative turbulator structure, once again built up of ribs 26 in a chevron pattern. The ribs 26 form turbulator strips 32. The height h' is the distance from the proximal side of a rib (i.e. the point on the rib adjacent to the wall part) to the distal side of a rib. The width a is the distance between two ribs in the longitudinal direction along a turbulator strip; alternatively, the width a is the straight line distance taken by two ribs along a turbulator strip. The width b' (or depth) is the distance between rib joins 27 in adjacent turbulator strips. Width b' may be the same as the length of the ribs 26A, 26B. FIG. 6B shows typical cooling fluid paths over the chevron structure of FIG. 6A. Each turbulator strip preferably consists of a zigzag line of ribs, with two sets of parallel ribs. In FIG. 6B, the cooling flow is shown as being perpendicular to one of the sets of ribs. The cooling flow could also be perpendicular to a line along a turbulator strip, as in FIG. 5.

To manufacture the hot gas wall described above, a braze foil is lain on a wall part. On top of the braze foil, a turbulator structure is placed (FIG. 2, 3A). The parts are then heated to braze them together (FIG. 3B).

The turbulator structure may be manufactured separately, and is typically manufactured by joining a number of ribs together. Turbulator strips may also be manufactured by bending straight strips of material or by building up turbulator parts by resistance welding; these parts can then be attached to the wall part.

An alternative method of turbulator structure manufacture uses resistance welding instead of brazing. A wall part is provided, on which a turbulator structure part such as a wire 40 is laid. The wire is then resistance welded to the wall part. A second wire is then laid on top of the first wire, and resistance welded to the first wire. This is repeated with as many wires as is necessary to attain the desired rib height.

FIGS. 7A to 7D show resistance welding of a rib. FIG. 7A shows part of a hot gas wall 12, with a back side 16 of the wall part and a resistance welded rib 26. In this case, the rib comprises two wires 40. FIG. 7B shows a side view of an embodiment in which four wires are used. At some points, the wires may be built up at an angle from the back wall with a tapered wire, as shown in FIG. 7C. A similar approach may be used at the top layer too, with a tapered wire. Ending with a tapered section is optional; alternatively a small gap could be left. FIG. 7D shows apparatus used for resistance welding. A casing 42 surrounds the wire 40 (a turbulator structure part), in electrical contact with the wire. The casing 42 is made of an electrically conductive material such as iron or copper or an alloy of iron or copper. The wire 40 is placed in contact with the back side 16 of the wall part and a current is passed through the wire and the back side. The current flows from a positive electrode attached to the casing 42 to a negative electrode attached to the wall part 13, either attached to the front side 14 or the back side 16. The result of the current is that some material is melted at the contact point between the wire and the back side, as the resistive heating is greatest at the contact point between the wire and the back side where the cross-section for the current to flow through is smallest. Once the current is removed, the melted material solidifies, producing a weld.

For subsequent wires, the same method can be repeated. For subsequent wires, one of the electrodes may be attached to a wire that has already been attached rather than to the wall part 13. Alternatively, the turbulator structure part could be a single rib or a collection of ribs that is resistance welded directly to the back side, rather than building up the ribs with wires.

The combustor 10 may be a primary, secondary or subsequent combustor in the case of a gas turbine with more than one combustor.

The hot gas wall 12 may be covered in a thermal barrier coating on the front side 14 of the wall part 13.

The turbulator structure may be provided on curved wall sections or on flat sections. The example shown in FIGS. 1A and 1B has curved wall sections curved along the longitudinal direction denoted by longitudinal combustor axis 118, and also curved in the plane perpendicular to the longitudinal combustor axis as shown in FIG. 1B. In alternative embodiments, the turbulator structure may alternatively be provided on sections curved only in the longitudinal direction denoted by longitudinal combustor axis 118, or curved only in the plane perpendicular to the longitudinal combustor axis.

Although a circular hot gas wall cross-section is shown in FIG. 1B, an oval cross-section or an irregular cross-section such as a rectangular cross-section with curved corners may also be used. The cross-section shape may be different at different points along the longitudinal combustor axis 118.

The turbulator structure may be provided on a convection cooled area of the hot gas wall, downstream of an impingement cooled area of the hot gas wall. The shape of the braze foil 20 after brazing is shown in FIG. 3B. This braze foil may provide various shapes in cross-section, such as a triangular or substantially triangular shape as in FIG. 3B, or a parabolic shape (that is, with the hypotenuse of the substantially triangular shaped cross-section of FIG. 3B as a parabola). A parabolic shape is preferred as it can provide more efficient heat transfer. The parabolic shape can be obtained naturally during the brazing step due to capillary action.

The honeycomb structure 22 may alternatively be replaced with another turbulator structure. One example is the turbulator strip 32 structure shown in FIGS. 6A and 6B. Other structures are also possible, and although regular repeating structures (such as structures that form diamonds or hexagons) are preferred, irregular turbulator structures may also be used.

The ribs 26 can be built up in various ways, and may be provided separately and joined together or may be as long sheets formed into the appropriate pattern. The chevron pattern of FIG. 6A has alternating ribs 26A, 26B 60° apart along their longitudinal (longest) axis, but may have ribs anywhere between 15° and 120°, preferably between 30° and 60° and most preferably 45°. The ribs may be made of any appropriate metal or alloy, for example Hastelloy X, and may vary depending on the conditions that the required part will be subject to. Preferably, the coefficient of thermal expansion of the ribs is similar to the coefficient of thermal expansion of the wall part.

The ribs (turbulator strips in this case) of the embodiment of FIG. 6A may be provided in different positions relative to one another. One way of looking at the ribs in this chevron pattern is by considering that whilst ribs 26A and 26B in two directions are provided, no ribs are provided in the third direction (26C as provided in the honeycomb structure mentioned above). In one embodiment, the ribs (turbulator strips) in the chevron pattern are placed in such a way that they essentially provide a honeycomb pattern without the third set of ribs 26C (FIG. 6D), which can be considered as out of phase. Alternatively, the ribs may be in phase, as shown in FIG. 6C. Other intermediate positions between these extremes are also possible (in FIGS. 6A and 6B, the ribs are shown as slightly out of phase).

In the embodiment shown in FIG. 6D, b' may be zero, forming a diamond or square pattern. In general, and particularly in chevron embodiments, different ribs may be different lengths.

The turbulator structure part (e.g. wire 40) may be made of the same material as, or a similar material to, the back wall, for example a nickel-based alloy, although differing materials may also be used.

Casing 42 may be various shapes and does not necessarily completely surround the turbulator structure part. Generally, the casing needs to contact an area of the turbulator structure part that is larger than the area of the turbulator structure part that is touching. A larger area of contact between the casing and the turbulator structure part allows a wider weld to be produced.

The methods described above may be used to manufacture new parts or for retrofitting, i.e. to add turbulator structures to existing hot gas walls. In a method of designing a hot gas wall according to the above description, a wall part is first constructed (without ribs). Thermal paint is added during a design phase, and during subsequent testing hot spots are identified in the thermal paint. Ribs can then be added in at least some of the areas where hot spots are present, to reduce the temperature of the hot spots. This method enables ribs to be placed only where necessary, which can minimise costs. Similarly, this method can be used to retrofit ribs on to an existing hot gas wall. In a method of retrofitting a hot gas wall, the additional step of cleaning the hot gas wall may be carried out first. Another possibility for retrofitting is the addition of extra height (such as by resistance welding a further turbulator part on an existing turbulator part) or addition of extra ribs on a hot gas wall that already includes ribs, either in between existing ribs or elsewhere on the hot gas wall. These methods of retrofitting could improve cooling without replacing existing parts.

Various modifications to the embodiments described are possible and will occur to those skilled in the art without departing from the invention which is defined by the following claims.

REFERENCE SIGNS

| | |
|---|---|
| 10 | gas turbine combustor |
| 12 | hot gas wall |
| 13 | wall part |
| 14 | front side |
| 16 | back side |
| 18 | curved section |
| 20 | braze foil/braze alloy |
| 22 | honeycomb structure |
| 24 | hexagon |
| 26, 26A, 26B, 26C | rib |
| 27 | join |
| 28 | cooling flow direction |
| 29 | line |
| 30 | cooling flow line |
| 32 | turbulator strip |
| 40 | wire |
| 42 | casing |
| 102 | impingement sheet |
| 104 | cooling holes |
| 106 | cooling fluid flow |
| 108 | cooling channel |
| 118 | longitudinal combustor axis |

The invention claimed is:

1. A method of cooling a hot gas wall for a gas turbine, the hot gas wall having a wall part with a front side and a back side, the wall part being configured for exposure to a hot fluid on the front side, the hot gas wall having a turbulator including a plurality of ribs attached to the back side of the wall part by a braze alloy placed between the turbulator structure and the back side of the wall part and subjected to brazing, and the hot gas wall having an impingement sheet arranged to direct a cooling fluid flow along the back side of the wall part, wherein the plurality of ribs form hexagons in a honeycomb structure, each rib having a height "h" being a distance from a side of the rib adjacent to the back side of the wall part to a side of the rib furthest from the back side of the wall part, each hexagon having a width "a" being a distance between a rib and a rib on an opposite side of the hexagon, each hexagon having a width "b" being a distance between a join of two ribs to a join of two ribs on an opposite side of the hexagon, wherein a ratio between the height "h" and a distance "H" being a distance between the back wall and the impingement sheet is between 0.01 and 0.3, a ratio between the width "a" and the height "h" is between 1 and 10, and a ratio between the width "b" and the height "h" is between 1 and 10, the method comprising:
directing a cooling fluid along the back side of the wall part.

2. A hot gas wall for a gas turbine, comprising:
a wall part with a front side and a back side, the wall part being configured for exposure to a hot fluid on the front side;
a turbulator including a plurality of ribs attached to the back side of the wall part by a braze alloy placed between the turbulator structure and the back side of the wall part and subjected to brazing; and
an impingement sheet arranged to direct a cooling fluid flow along the back side of the wall part, wherein the plurality of ribs form hexagons in a honeycomb structure, each rib having a height "h" being a distance from a side of the rib adjacent to the back side of the wall part to a side of the rib furthest from the back side of the wall part, each hexagon having a width "a" being a distance between a rib and a rib on an opposite side of the hexagon, each hexagon having a width "b" being a distance between a join of two ribs to a join of two ribs on an opposite side of the hexagon, wherein a ratio between the height "h" and a distance "H" being a distance between the back wall and the impingement sheet is between 0.01 and 0.3, a ratio between the width "a" and the height "h" is between 1 and 10, and a ratio between the width "b" and the height "h" is between 1 and 10.

3. The hot gas wall of claim 2, wherein the wall part comprises:
a curved section and the turbulator structure is attached to the curved section of the wall part.

4. The hot gas wall of claim 3, wherein the curved section is curved along a longitudinal direction denoted by a longitudinal axis and also curved in a plane perpendicular to the longitudinal axis.

5. The hot gas wall of claim 2, wherein the turbulator is arranged in a honeycomb pattern.

6. The hot gas wall of claim 2, in which the plurality of ribs of the turbulator comprise:
a first set of ribs parallel to one another and a second set of ribs parallel to one another and not parallel to the first set of ribs, wherein the turbulator structure is configured to be orientated such that a cooling flow direction is parallel to the first set of ribs, or such that the cooling flow direction is at the same angle from the first set of ribs and the second set of ribs.

7. A gas turbine or a gas turbine combustor comprising: the hot gas wall of claim 2.

* * * * *